March 1, 1955 H. SCHMITT 2,703,167
BEARING FRAME UNIT FOR KEY-OPERATED BUSINESS MACHINES
Filed June 21, 1952 2 Sheets-Sheet 1
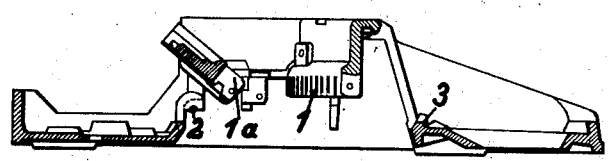
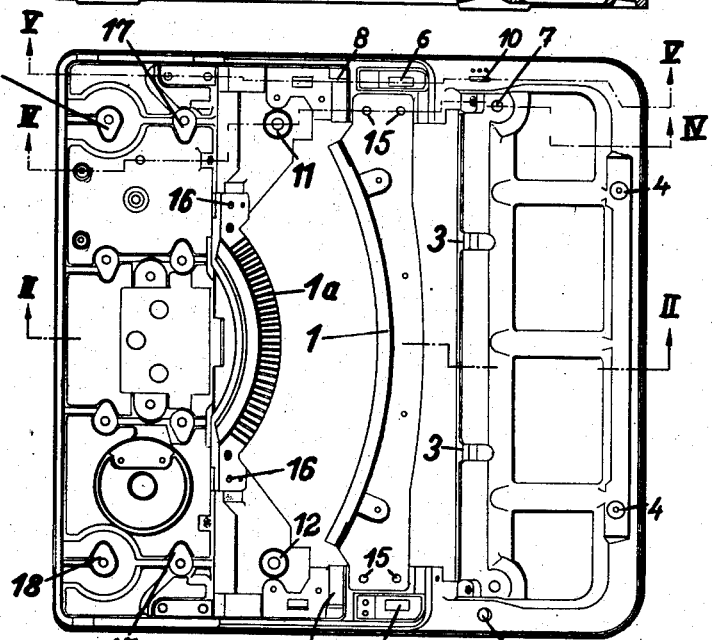
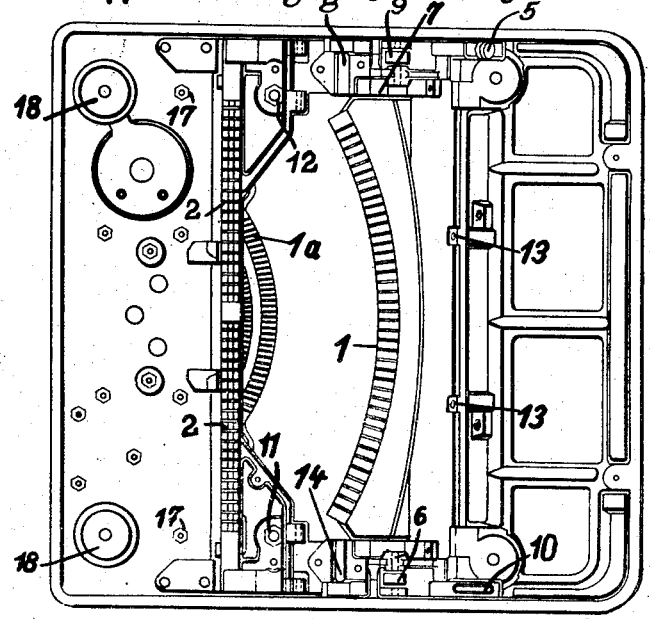
Inventor:
Heinrich Schmitt
By F. D. Prager
Att'y March 1, 1955 H. SCHMITT 2,703,167
BEARING FRAME UNIT FOR KEY-OPERATED BUSINESS MACHINES
Filed June 21, 1952 2 Sheets-Sheet 2
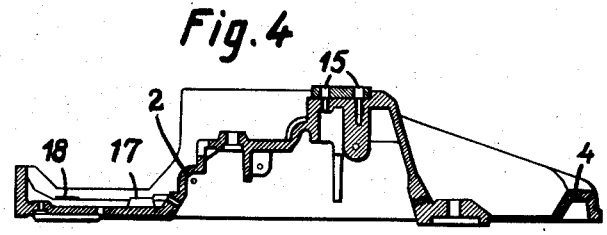
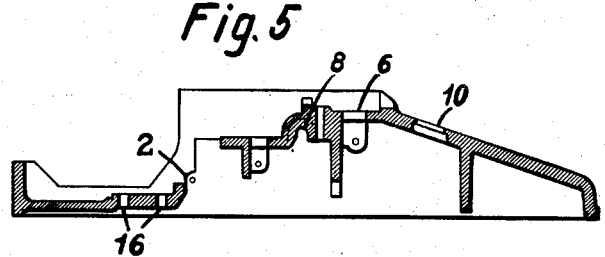
Inventor:
Heinrich Schmitt

United States Patent Office 2,703,167
Patented Mar. 1, 1955

2,703,167

BEARING FRAME UNIT FOR KEY-OPERATED BUSINESS MACHINES

Heinrich Schmitt, Frankfurt am Main, Germany, assignor to Rudolph Wittich, Frankfurt am Main, Germany Application June 21, 1952, Serial No. 294,810

Claims priority, application Switzerland June 22, 1951

2 Claims. (Cl. 197—186)

This invention relates to office machines, particularly key operated typewriters. More specifically the invention is concerned with the bearing frames of such machines.

An object of the invention is to make the bearing frame complete with all bearing points entirely as a plastic pressing, the required mechanical strength and dimensional accuracy of the pressed parts being suitably provided for.

A feature of the invention is that the plastic bearing frame is adapted to a vertical layout (i. e. in the direction of working pressure) of all bearing and guiding surfaces, without overlapping, in such manner that local accumulations of material or undesirable changes in cross-section are avoided.

Another feature is that all the journal and pivot bearings as well as the guiding or bearing surfaces form a statically coherent part of the frame and that the latter is made entirely of a hardenable impact and bending resistant, plastic material in a single pressing operation.

Yet another feature is that the bearing points are essentially under-dimensioned, and that transition members in the form of webs connected with the casing walls, are provided to equalize the stress in the direction of the least moment. This under-dimensioning of the material in order to enable a uniform distribution of the cross-sectional areas to be obtained, governed by the weakest cross-section, is in the case of the more highly-stressed bearings compensated by the fact that such bearing points are throughout arranged at the junction of webs with the connecting fins or ribs to adjacent bearings, or to the necessary bearing frame parts integral with the main frame structure, in such manner that both the tension and the compression stresses, as well as the forces normal thereto are received not by the insufficient effective cross-section of the bearing, but by the carrying ribs of the wall. This prevents both flexure and rupture (the last being a characteristic disadvantage of plastic materials) and for the first time enables the dimensional accuracy of the pressed parts to attain a standard corresponding to that of precision mechanics.

All bearing and guiding surfaces are arranged side by side in parallel, all bearings running in the direction of their tension and compression stress, as well as being linked perpendicularly thereto with fins or walls by which they are interconnected, such fins or walls ultimately merging in the outer walls of the frame.

Preferably the walls of the bearing frame are given a slight, uniform taper.

The accompanying drawing shows an example of a typewriter bearing frame in accordance with the invention of plastic material.

Fig. 1 is a general plan view of a bearing frame.

Fig. 2 represents a cross-section in the plane II—II of Fig. 1.

Fig. 3 is a plan view of the under side of the bearing frame.

Fig. 4 represents a cross-section in the plane IV—IV of Figure 1.

Fig. 5 represents a section in the plane V—V of Fig. 1.

The illustrated typewriter bearing frame incorporates the following bearing points: the intermediate type lever bearing 1, the rocker lever segment 1a, the key lever bearing 2 with bearing surface and drilled holes for securing the pivot pins, the bearings 3 for the space key, bearings and holes 4 for the space bar crank, the guide 5 for the margin release button, the bearing 6 for the margin release lever, the bearings 8 for the cover lock, the guide slots 9 for the cover release, the guide slots 10 for the ribbon setting lever, the bearing surfaces and holes 13 for the key-guide, bearings 14 for the reversing lever, reversing and locking holes, bearing surfaces and bearings for the ribbon motion, bearings 11, 12 for the ribbon-feed mechanism, bearings for the ribbon reel spindles, and bearings for the ribbon lift.

The bearing frame body also includes a bearing point with attachment holes for the intermediate type lever bearing 1, and the bearing point with attachment holes for the rocker lever segment 1a, as well as bearing points with adjustable holes for the key-shift lever guides, which are integral with the main frame. These bearing points are indicated in the drawing by 15 and 16 respectively.

It should further be mentioned that the frame also includes the bearings and holes for the rubber feet 17 with washers and the attachment holes for the carriage bed 18.

The illustrated form of bearing frame ensures material advantages in addition to the features pointed out above. Owing to the reduction in the number of parts, and in weight, without the use of additional, sound-damping means such as fabric interlays, underlays or the like, a simplified and very much cheaper arrangement is obtained. Furthermore, the use of a plastic material considerably increases the absorption of sound.

I claim:

1. A unitary bearing frame body of hardenable, impact and bending resistant, resinous plastic material for key-operated business machines such as typewriters, comprising as integral parts of said unitary body: a substantially rectangular outer wall surrounding the entire area for the keys and other parts of the machine and having slight upward taper; support parts for the frame, support parts for sliding and associated parts of the machine, a plurality of sets of slot-separated bearing guides for keys and key-operated levers, and reinforcement walls linking the bearing guides of each set together and interconnecting them with said outer wall, said several support parts and bearing guides being arranged within the area surrounded by said outer wall, side by side and at different levels without overlap, and forming, by said reinforcement walls, a statically coherent body with said outer wall.

2. A bearing frame body as described in claim 1 characterized by the further feature that each set of bearing guides forming a part of the unitary body is interconnected in the described manner in two planes substantially perpendicular to one another, the body comprising a pair of wall means for each set of bearing guides, for such interconnection.

References Cited in the file of this patent

UNITED STATES PATENTS 2,343,321     Pascher _____ Mar. 7, 1944

FOREIGN PATENTS 236,251     Switzerland _____ June 16, 1945
462,090     Great Britain _____ Mar. 2, 1937